United States Patent [19]

Pankhurst

[11] Patent Number: 5,708,877
[45] Date of Patent: Jan. 13, 1998

[54] FOLDING ASSEMBLY FOR USE WITH AN IMAGING DEVICE

[76] Inventor: Paul Hayes Pankhurst, 286 Munster Road, London SW6 6BQ, England

[21] Appl. No.: 763,074

[22] Filed: Dec. 10, 1996

Related U.S. Application Data

[63] Continuation-in-part of Ser. No. 689,453, Aug. 9, 1996, abandoned.

[51] Int. Cl.[6] .......................... G03B 15/03; G03B 17/04; H04N 5/225
[52] U.S. Cl. ........................ 396/178; 396/348; 348/375
[58] Field of Search .................... 396/177, 178, 396/344, 345, 348, 346, 347, 349, 350; 348/375

[56] References Cited

U.S. PATENT DOCUMENTS

| | | |
|---|---|---|
| 1,362,833 | 12/1920 | Balston . |
| 1,435,646 | 11/1922 | Kroedel . |
| 1,826,243 | 10/1931 | Fuerst . |
| 2,063,310 | 12/1936 | Green ........................ 95/40 |
| 3,709,131 | 1/1973 | Plummer ..................... 95/39 |
| 4,268,146 | 5/1981 | Johnson ...................... 354/145 |
| 4,545,661 | 10/1985 | Hamaguchi et al. ......... 354/86 |
| 4,597,656 | 7/1986 | Yamashita .................. 354/193 |
| 5,066,967 | 11/1991 | Yamamoto et al. ......... 354/149.11 |
| 5,142,465 | 8/1992 | Sato ............................ 362/285 |
| 5,270,757 | 12/1993 | Tosaka et al. ............... 354/149.11 |
| 5,329,327 | 7/1994 | Arai et al. ................... 354/149.11 |
| 5,565,941 | 10/1996 | Kaneko ....................... 396/177 |

*Primary Examiner*—Safet Metjahic
*Assistant Examiner*—John Chizmar
*Attorney, Agent, or Firm*—Robert A. Sabourin

[57] ABSTRACT

A folding assembly for use with an imaging device can foldably connect a first housing section to a second housing section so as to accommodate movement of the first and second housing sections relative to each other between erect and folded positions. The folding assembly includes: first housing section carrying a projection pin thereon; second housing section including a slot for defining a passage for movement of the projection pin, therealong, first and second restraining portions being adjacent to respective opposite ends of the passage and operable for releasably restraining the projection pin such that the first and second housing sections move between the erect and folded positions as the projection pin moves between the first and second restraining portions, each of the restraining portions including at least a flexibly resilient arm and a cooperating recess adjacent thereto, such that each one of the arms resiliently urges the projection pin into engagement with a corresponding one of the cooperating recesses, such that the first and second housing sections are in the erect position when the projection pin cooperates with the first restraining portion and in the folded position when the projection pin cooperates with the second restraining portion.

6 Claims, 5 Drawing Sheets

FOLDING ASSEMBLY FOR USE WITH AN IMAGING DEVICE

This application is a continuation-in-part of U.S. patent application Ser. No. 08/689,453 filed Aug. 9, 1996 by Paul Hayes Pankhurst, abandoned.

BACKGROUND OF THE INVENTION

The invention detailed herein relates generally to a folding assembly for use in an imaging device, such as a camera, between erect and folded conditions whereby a first housing section is moveable in relation to a second housing section.

Cameras with folding sections are well known in the art. They often include a built-in electronic flash or strobe unit which is foldable to be erect during periods of use and folded or retracted during periods of non-use. Of course, the folding section of a camera need not be a strobe unit, but could be any part of the camera such as, but not limited to, a housing, lens, viewfinder, etc. There are advantages in using a folding camera section, for example, in protecting parts from dust, dirt, scratching and breakage.

In U.S. Pat. No. 4,268,146 issued May 19, 1981 to Johnson, a camera is disclosed having a cooperating pair of latching structures, each having a mounting section and a latching cam. The latching cam includes a quarter sector cam face, an upwardly facing top or erect position beveled latching cam face, and a rearwardly facing beveled latching cam face. Also forming part of the latching structure on the mounting section is an erect position stop tab or rib. The latching cam locks into an open or closed position as desired by the user.

In U.S. Pat. No. 5,142,465 issued Aug. 15, 1992 to Sato, a strobe pop-up apparatus is disclosed in which a strobe body is moved between a retracted position and a projected position. The apparatus includes rotational levers which are pivoted at one end to the sides of a front portion of the strobe body and which are pivoted at their opposite ends to supporting members, and a cam guide mechanism having cam grooves and pins fitted in the cam grooves, between the sides of a rear portion of the strobe body and the supporting members, for guiding the movement of the strobe body between the retracted position and the projected position in accordance with the rotational lever.

U.S. Pat. No. 5,270,757 issued Dec. 14, 1993 to Tosaka et al. discloses a camera having: a camera body; a flash unit which is movable between a first position where it is stored in the camera body and a second position where it is popped-up from the camera body; and a toggle mechanism adapted to change a direction of a bias force acting on the flash unit between a first direction, in which the flash unit is biased toward the popped-up position, and a second direction, in which the flash unit is biased toward the stored position, in response to the movement of the flash unit relative to the camera body.

It is a primary object of the present invention to provide an improved folding assembly for use with folding sections of imaging devices and their accessories.

SUMMARY OF THE INVENTION

A folding assembly for use with an imaging device can foldably connect a first housing section to a second housing section so as to accommodate movement of the first and second housing sections relative to each other between erect and folded positions. The folding assembly includes: first means connected to one of the first and second housing sections and carrying projection means thereon; and second means connected to the other of the first and second housing sections for defining a passage for movement of the projection means therealong, first and second restraining means being adjacent to respective opposite ends of the passage and operable for releasably restraining the projection means such that the first and second housing sections move between the erect and folded positions as the projection means moves between the first and second restraining means, each of the restraining means including at least a flexibly resilient arm and a cooperating means adjacent thereto, such that each one of the arms resiliently urges the projection means into engagement with a corresponding one of the cooperating means, such that the first and second housing sections are in the erect position when the projection means cooperates with the first restraining means and in the folded position when the projection means cooperates with the second restraining means.

BRIEF DESCRIPTION OF THE DRAWINGS

The aforementioned aspects and other features of the invention are described in detail in conjunction with the accompanying drawings in which the same reference numerals are used throughout for denoting corresponding elements and wherein.

DETAILED DESCRIPTION OF THE PREFERRED EMBODIMENTS

Figure 1:
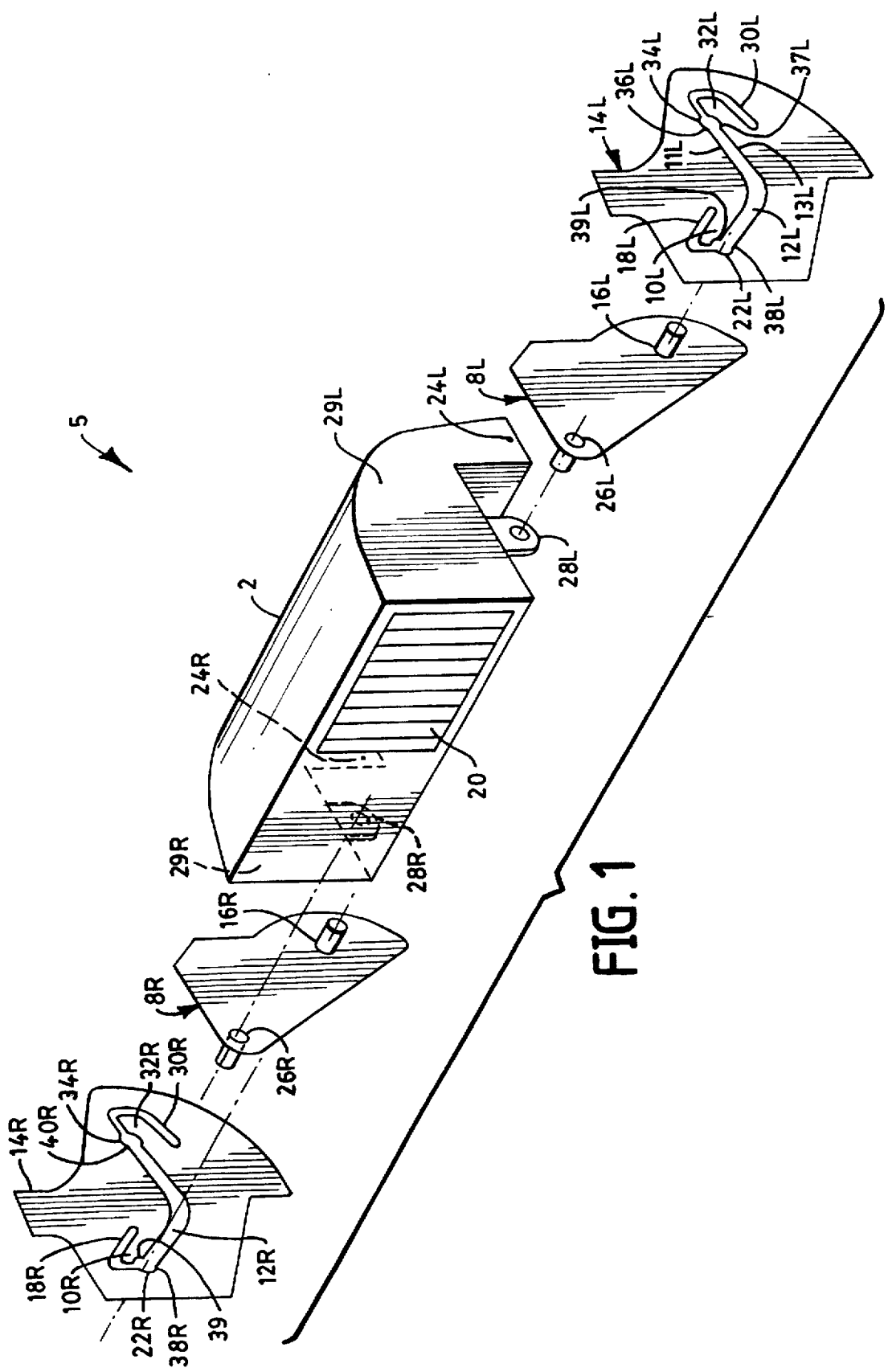
FIG. 1 is a perspective exploded diagrammatic view of one embodiment of the inventive folding assembly as applied to a strobe unit for use with a camera.
Figure 2:
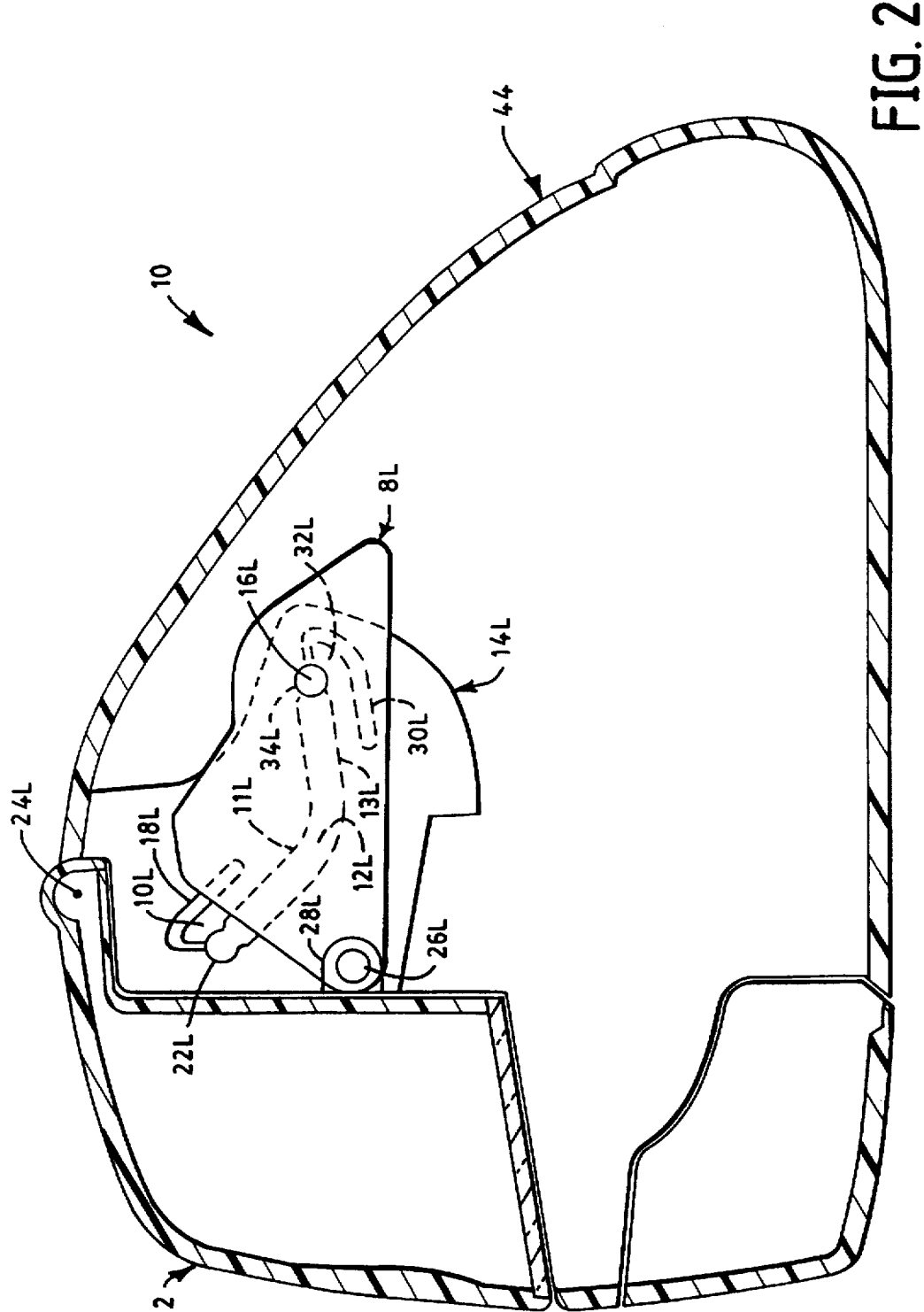
FIG. 2 is a left side cutout view of a camera using the inventive folding assembly of FIG. 1 in cooperation with the strobe unit in a folded position.
Figure 3:
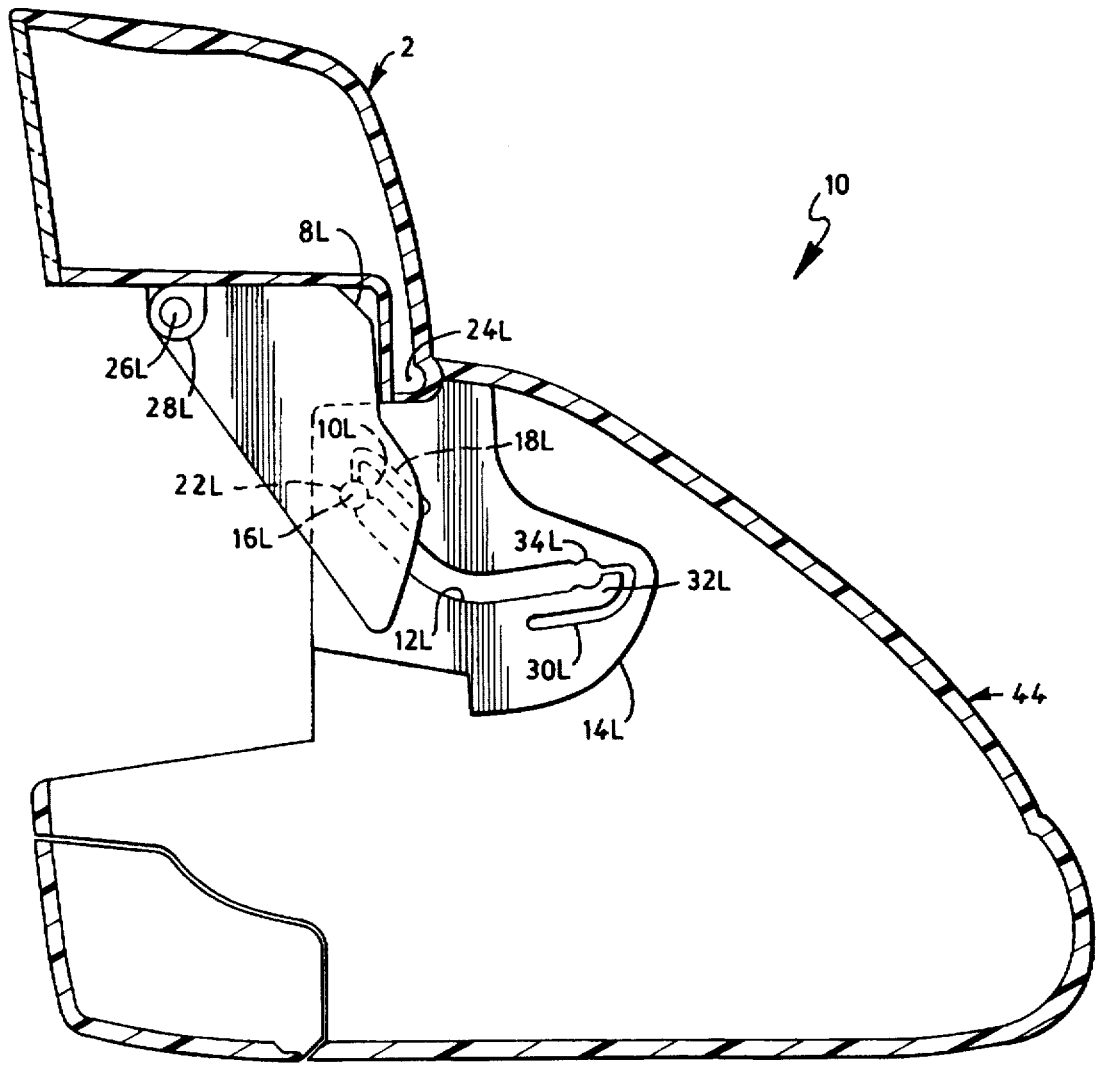
FIG. 3 is a left side cutout view of a camera using the inventive folding assembly of FIG. 1 in cooperation with the strobe unit in an erect position.

Reference is made to FIGS. 1–3 for illustrating one embodiment of a folding assembly 5 for use with an imaging device such as a camera 10 to enable movement of a second housing section 2 of the camera 10 to either an erect position as shown in FIG. 3 or a folded position as in shown FIG. 2, with respect to a first housing section 44 of the camera 10. The second housing section or strobe unit 2 is movable in relation to the first housing section or camera body 44, about a pivot 24L. Although the structure shown in FIG. 1 includes two hinges 8L and 8R along with two stationary components or aprons 14L and 14R, the most basic folding assembly according to the invention and described hereinafter includes but one hinge 8L and one apron 14L. In other words, the folding assembly according to the invention could in a simpler embodiment be structured to fold only along one side or the other (such as the left side 29L) of the strobe unit 2. In that case, the folding assembly components of FIG. 1 having reference numbers suffixed with an "R" would be eliminated and only the components having reference numerals suffixed with an "L" would remain.

The camera 10 of FIGS. 2 and 3 includes a first housing section or camera body 44 and a second housing section or strobe unit 2. The preferred embodiment of a folding assembly 5 as illustrated in FIG. 1 for use in the camera 10 includes: first means such as aprons 14L and 14R connected to the first housing section 44 and having carrying projection means such as pins 16L and 16R thereon; and second means or hinges 8L and 8R connected to the second housing section 2 for defining a passage or slot 12L and 12R for movement of the projection means 16L and 16R therealong. The first and second means are positioned adjacent each lateral end of the first means as illustrated in FIG. 3. The second means includes members which define the slots 12L and 12R, restraining arms 10L, 10R, 32L, 32R and corresponding recesses 22L and 22R. The folding assembly 5 also includes first and second restraining means located adjacent to respective opposite ends of the passage 12L and 12R and operable for releasably restraining the projection means 16L and 16R such that the first and second housing sections 44 and 2 move in relation to one another between erect and folded positions as the projection means 16L and 16R moves between the first and second restraining means.

Figure 4A:
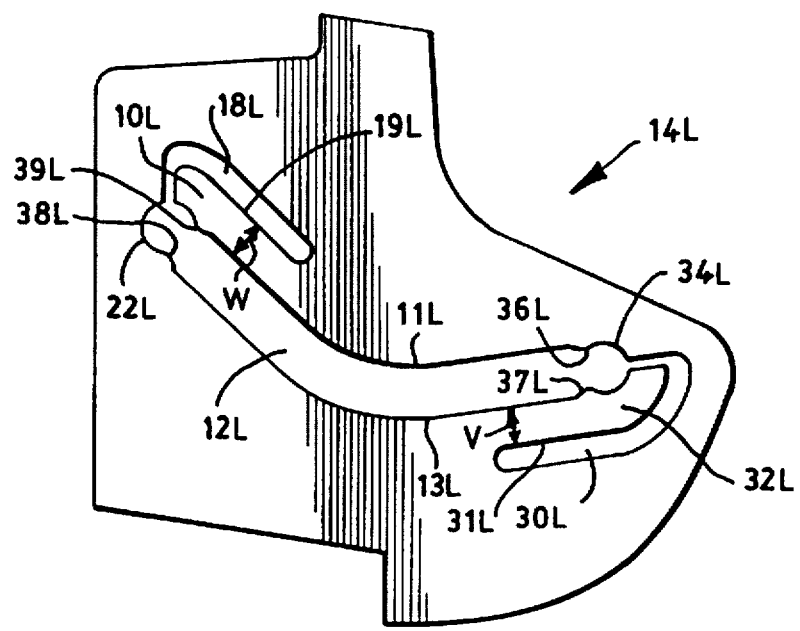
FIG. 4A is a side view of a left apron of the folding assembly of FIG. 1.
Figure 4B:
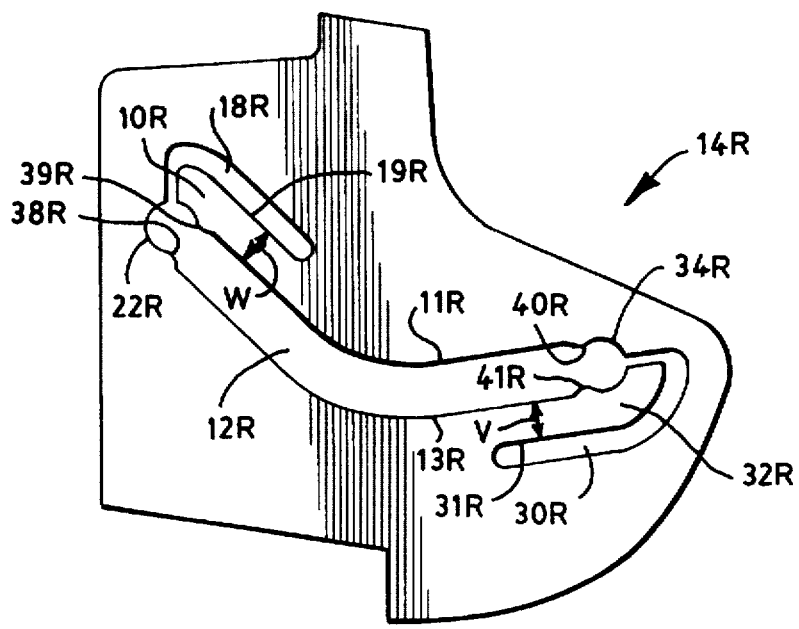
FIG. 4B is a side view of a right apron of the folding assembly of FIG. 1.
Figure 5B:
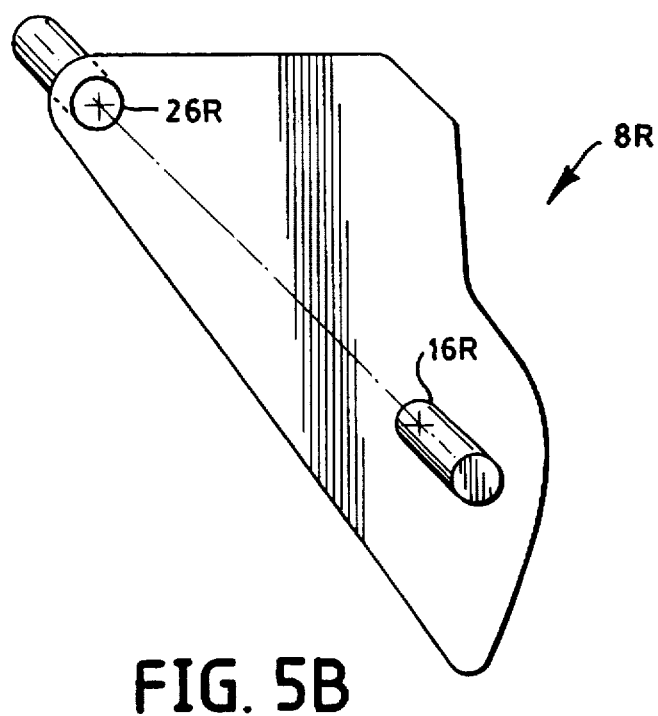
FIG. 5B is a side view of a right hinge of the folding assembly of FIG. 1.

In this embodiment the first restraining means corresponds on the left apron 14L, as viewed in FIG. 4A, to recess 22L, the sidewalls 38L and 39L which narrow the slot 12L, and the flexible restraining arm 10L defined by the secondary slot or cutout 18L as having a predetermined width "W". The first restraining means also corresponds on the right apron 14R, as viewed in FIG. 4B, to recess 22R, the sidewalls 38R and 39R which narrow the slot 12R, and the flexible restraining arm 10R defined by the secondary slot or cutout 18R as having, preferably, the same predetermined width "W". If desired, the width of the flexible restraining arms 10L and 10R may vary.

The second restraining means in the current embodiment corresponds on the left apron 14L to recess 34L, the sidewalls 36L and 37L which narrow the slot 12L, and the flexible restraining arm 32L defined by the secondary slot or cutout 30L as having a predetermined width "V". The second restraining means also corresponds on the right apron 14R to recess 34R, the sidewalls 40R and 41R which narrow the slot 12R, and the flexible restraining arm 32R defined by the secondary slot or cutout 30R as having a predetermined width "V". If desired, the width of the flexible restraining arms 32L and 32R may vary.

The force necessary to release the second housing 2 from the folded position may differ from the force necessary to release the second housing 2 from the erect position, so that the width "V" of the flexible restraining arms 32L and 32R may accordingly differ from the width "W" of the flexible restraining arms 10L and 10R. Furthermore, the width of each restraining arm 10L, 10R, 32L and 32R may vary to provide different restraining forces thereto. In other words, the width of each restraining arm 10L, 10R, 32L and 32R is directly related to the amount of force required to maintain or remove the second housing 2 in or from the erect or folded positions. Typically, more force is required to lift the second housing 2 from the folded condition to the erect condition than to move the second housing 2 from the erect condition to the folded condition.

Each of the restraining means includes at least a flexibly resilient arm 32L or 32R, and cooperating means adjacent thereto such that each of the flexibly resilient arms 32L and 32R urges the projection means 16L and 16R into engagement with a corresponding one of the cooperating means, so that the first and second housing sections are in the erect position when the projection means cooperates with the first restraining means and in the folded position when the projection means cooperates with the second restraining means.

The cooperating means of the first restraining means corresponds to both the recess 22L on the left apron 14L, and the recess 22R on the right apron 14R. Similarly, the cooperating means of the second restraining means corresponds to both the recess 34L on the left apron 14L, and the recess 34R on the right apron 14R.

The components of the folding assembly 5 which interact with the left side 29L of the strobe unit 2 are indicated by reference numerals suffixed with the letter "L". In a similar manner, the components of the folding assembly 5 which interact with the right side 29R of the strobe unit 2 are indicated by reference numerals suffixed with the letter "R". For instance, component 28L on the left side of the folding assembly 5 mirrors component 28R on the right side, etc. Thus, the following description of components located on the left side of the folding assembly 5 in FIG. 1 is also applicable to describe the components located on the right side of the folding assembly 5 merely by changing the suffix of each reference numeral from L to R.

Figure 5A:
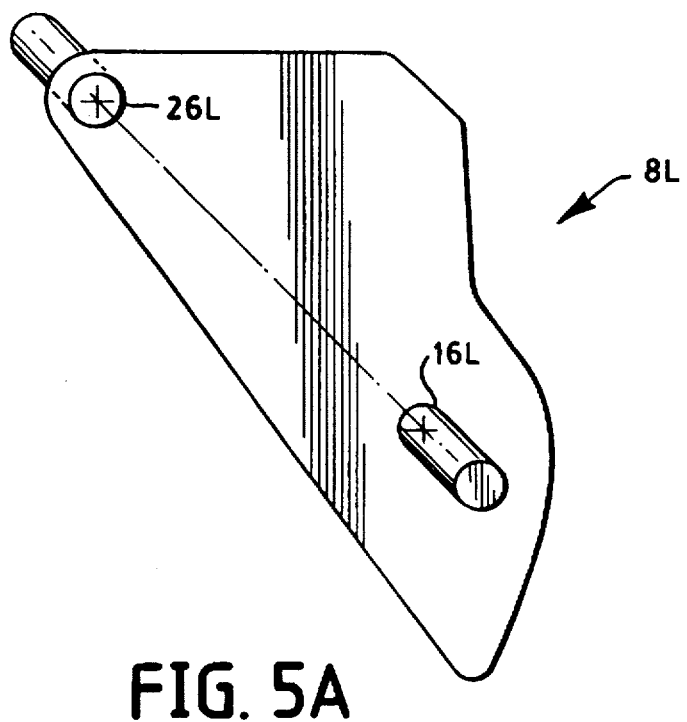
FIG. 5A is a side view of a left hinge of the folding assembly of FIG. 1.

The components of the folding assembly 5 which interact with the left side 29L of the strobe unit 2 include a left tab 28L which is integrally attached to the strobe unit 2, a pivot 24L resident on the strobe unit 2, a left hinge 8L and a left apron or stationary component 14L. An enlarged left side view of the left apron 14L is shown in FIG. 4A and an enlarged left side view of the left hinge 8L is shown in FIG. 5A. Although both the left hinge 8L and the left apron 14L are substantially planar having irregular shapes as viewed in FIGS. 4A and 5A for the preferred embodiment, these components could be non-planar or could take on other shapes.

The left hinge 8L includes a first pin 16L and a second pin 26L which are spaced apart as illustrated. The left apron 14L includes: sidewalls 11L and 13L defining an elongated curvilinear slot 12L; a recess 22L is located adjacent to one end of the slot 12L and a flexibly resilient arm 10L having a width W as measured substantially perpendicularly from the sidewall 11L of the slot 12L to the sidewall 19L of the secondary slot or cutout 18L. The slot 12L need not necessarily be curvilinear in other embodiments.

The left apron 14L also includes a recess 34L located at the other end of the slot 12L; a pin receiving junction area is formed between the slot 12L and the recess 34L where portions 36L and 37L of the sidewalls 11L and 13L, respectively, project into the slot 12L; and an elongated secondary slot or cutout 30L extending from the recess 34L. The hinge 8L forms a flexibly resilient arm 32L having approximately the same width W as the width of the flexibly resilient arm 10L, this time measured substantially perpendicularly from the sidewall 13L of the slot 12L to the sidewall 31L of the cutout 30L.

The left apron or stationary component 14L is fixedly attached to camera body 44 by any known means (not shown) for assembling camera parts. The strobe unit 2 pivotally moves about the pivot 24L to reside in either the folded position shown in FIG. 2 or the erect position shown in FIG. 3. The left hinge 8L is connected to the strobe unit 2 by attachment of the pin 26L to tab 28L. Pin 26L is integrally connected to the left hinge 8L and tab 28L is integrally connected to the strobe unit 2. Pin 16L of the left hinge 8L is also slidably attached to the left apron 14L along the slot or passage 12L. When the strobe unit 2 is in the folded position, as shown in FIG. 2, the pin 16L is engaged with recess 34L at one end of the slot 12L. When the strobe unit 2 is in the erect position, as shown in FIG. 3, the pin 16L is engaged with recess 22L at the other end of the slot 12L. When the strobe unit 2 is moved between the erect and folded positions, the pin 16L slidably moves along the passage 12L in response to a relatively constant force applied (not shown) either mechanically or by a user. However, the user must exert an increased force to move the pin 16L into the recess 22L whereby the flexible arm 10L resiliently restrains the pin.

Turning to FIG. 4A, the pin 16L (not shown) when moving along the passage 12L must overcome the resilience of the arm 32L before engaging with recess 34L. The junction area is formed by portions 36L and 37L of the sidewalls 11L and 13L, respectively, projecting into the slot 12L. The increased force required to pass the pin 16L through the junction is in part established by the width "V" of the flexarm 32L and, in fact, is directly related in a mathematical sense to the width "V" of the flexarm 32L. Thus, when the width "V" increases, the increased force increases and when the width "V" decreases, the increased force decreases. The widths "V" and "W" may vary for each flexarm 32L and 10L, if desired, and the distance that the sidewalls project into the slot 12L may also vary.

Other factors also contribute to variations in the increased force required to move the pin 16L between the slot 12L and the recesses 22L and 32L. These include, but are not limited to, the distance (not marked) between the corresponding portions 39L and 38L (or 36L and 37L) of the sidewalls 11L and 13L which form the junctions, the material of the flexarms 32L and 10L and the lengths (not marked) of the cutouts 30L and 18L. In any event, the increased force required to move the pin 16L in or out of one of the recesses 22L and 32L can be predetermined to match, for instance, the minimal force required to offset the weight of the given strobe unit 2 so that the strobe unit 2 will remain erect or folded until a specific action is taken to change its position.

It is to be understood that the above described embodiments are merely illustrative of the present invention and represent a limited number of the possible specific embodiments that can provide applications of the principles of the invention. Numerous and varied other arrangements may be readily devised in accordance with these principles by those skilled in the art without departing from the spirit and scope of the invention as claimed.

I claim:

1. A folding assembly, for use with an imaging device, for foldably connecting a first housing section to a second housing section so as to accommodate movement of the first and second housing sections relative to each other between erect and folded positions, said folding assembly comprising:

first means connected to one of the first and second housing sections and carrying projection means thereon; and second means connected to the other of the first and second housing sections for defining a passage for movement of said projection means therealong, first and second restraining means being adjacent to respective opposite ends of said passage and operable for releasably restraining said projection means such that said first and second housing sections move between the erect and folded positions as said projection means moves between said first and second restraining means, each of said restraining means including at least a flexibly resilient arm and a cooperating means adjacent thereto, such that each one of said arms resiliently urges said projection means into engagement with a corresponding one of said cooperating means, such that said first and second housing sections are in the erect position when said projection means cooperates with said first restraining means and in the folded position when said projection means cooperates with said second restraining means.

2. A camera comprising:

a first housing section;

a second housing section pivotally mounted to said first housing section and being adapted to be foldably connected to said first housing section so as to accommodate movement of said first and second housing sections relative to each other between erect and folded positions;

first means connected to one of said first and second housing sections and carrying projection means thereon; and second means connected to the other of said first and second housing sections for defining a passage for movement of said projection means therealong, first and second restraining means being adjacent to respective opposite ends of said passage and operable for releasably restraining said projection means such that said first and second housing sections move between the erect and folded positions as said projection means moves between said first and second restraining means, each of said restraining means including at least a flexibly resilient arm and a cooperating means adjacent thereto, such that each one of said arms resiliently urges said projection means into engagement with a corresponding one of said cooperating means, such that said first and second housing sections are in the erect position when said projection means cooperates with said first restraining means and in the folded position when said projection means cooperates with said second restraining means.

3. The camera of claim 2, wherein said arm of said first restraining means provides a restraining force different than said arm of said second restraining means, whereby different forces are required to release said projection means from said first and second restraining means.

4. The camera of claim 2, wherein said projection means on said first means includes a pin, said passage is defined by a slot, and said cooperating means includes a recess for receiving said pin.

5. The camera of claim 4, wherein said second means includes a member which defines said slot, said restraining arms and corresponding ones of said recesses.

6. The camera of claim 2, where the first housing section includes a strobe and said first and second means are positioned adjacent each lateral end of said first means.

* * * * *